(12) United States Patent
Lord

(10) Patent No.: US 12,132,829 B2
(45) Date of Patent: Oct. 29, 2024

(54) COMBINING QKD AND CLASSICAL COMMUNICATION

(71) Applicant: British Telecommunications Public Limited Company, London (GB)

(72) Inventor: Andrew Lord, London (GB)

(73) Assignee: British Telecommunications Public Limited Company (GB)

(*) Notice: Subject to any disclaimer, the term of this patent is extended or adjusted under 35 U.S.C. 154(b) by 224 days.

(21) Appl. No.: 17/753,772

(22) PCT Filed: Aug. 18, 2020

(86) PCT No.: PCT/EP2020/073130
§ 371 (c)(1),
(2) Date: Mar. 14, 2022

(87) PCT Pub. No.: WO2021/047865
PCT Pub. Date: Mar. 18, 2021

(65) Prior Publication Data
US 2022/0376905 A1 Nov. 24, 2022

(30) Foreign Application Priority Data
Sep. 12, 2019 (EP) .................................... 19197082

(51) Int. Cl.
*H04L 9/08* (2006.01)
(52) U.S. Cl.
CPC .......... *H04L 9/0852* (2013.01); *H04L 9/0819* (2013.01)
(58) Field of Classification Search
CPC ............................ H04L 9/0852; H04L 9/0819
See application file for complete search history.

(56) References Cited

U.S. PATENT DOCUMENTS 7,248,695 B1 * 7/2007 Beal ...................... H04L 9/0852
380/283
2005/0025486 A1 2/2005 Zhong et al.
(Continued)

FOREIGN PATENT DOCUMENTS

CN 209170378 U 7/2019

OTHER PUBLICATIONS

Bahrani S., et al., "Wavelength Assignment in Hybrid Quantum-Classical Networks," arxiv.org, 2017.
(Continued)

*Primary Examiner* — Baotran N To
(74) *Attorney, Agent, or Firm* — Pranger Law PC

(57) ABSTRACT

There is herein disclosed a method of communication between a client pair, the client pair including an upstream client and a downstream client, the method being performed over a first optical fiber in an optical fiber pair and including: transmitting a downstream DWDM signal over the first optical fiber, wherein the downstream DWDM signal has a first frequency and contains first data originating from the upstream client, transmitting an upstream DWDM signal over the first optical fiber, wherein the upstream DWDM signal has a second frequency and contains second data originating from the downstream client, wherein the first frequency is different to the second frequency, and performing Quantum Key Distribution over the second optical fiber of the optical fiber pair.

10 Claims, 3 Drawing Sheets

(56) References Cited

U.S. PATENT DOCUMENTS

| | | | | |
|---|---|---|---|---|
| 2007/0212063 | A1* | 9/2007 | Meli | H04J 14/0227 398/30 |
| 2013/0051800 | A1* | 2/2013 | Soto Rodriguez | H04L 9/0852 398/65 |
| 2016/0233964 | A1* | 8/2016 | Frohlich | H04B 10/85 |
| 2016/0234018 | A1* | 8/2016 | Frohlich | H04B 10/70 |
| 2018/0234198 | A1 | 8/2018 | Lin et al. | |

OTHER PUBLICATIONS

Cai C., et al., "Experimental Wavelength-Space Division Multiplexing of Quantum Key Distribution With Classical Optical Communication Over Multicore Fiber," arXiv:1811.04198v1 [quant-ph], Nov. 10, 2018, XP081144162, DOI: 10.1364/0E.27.005125, 6 pages.

Choi I., et al., "First Quantum Secured 10-GB/s DWDM Transmission over the Same Installed Fibre," The European Conference on Optical Communication (ECOC 2014), Sep. 21, 2014, 3 pages.

Combined Search and Examination Report under Sections 17 and 18(3) for Great Britain Application No. 1913188.7 mailed on May 28, 2020, 11 pages.

Eraerds P., et al., "Quantum Key Distribution and 1 Gbit/S Data Encryption Over a Single Fibre," arXiv:0912.1798v1 [quant-ph], Dec. 9, 2009, 16 pages.

Eraerds P., et al., "Quantum Key Distribution and 1 Gbps Data Encryption Over a Single Fibre," New Journal of Physics, vol. 12, Jun. 15, 2010.

Extended European Search Report for Application No. 19197082.1, mailed on Feb. 20, 2020, 11 pages.

Gyselings T., et al., "Crosstalk Analysis of Multiwavelength Optical Cross Connects," Journal of Lightwave Technology, vol. 17, No. 8, Aug. 1999, pp. 1273-1283.

International Search Report and Written Opinion for Application No. PCT/EP2020/073130, mailed on Sep. 4, 2020, 13 pages.

Niu J., et al., "Optimized Channel Allocation Scheme for Jointly Reducing Four-Wave Mixing and Raman Scattering in the DWDM-QKD System," Applied Optics, vol. 57, No. 27, Sep. 18, 2018, XPO55667764, ISSN: 1559-128X, DOI: 10.1364/A0.57.007987, pp. 7987-7996.

Stohr A., et al., "Full-Duplex Fiber-Optic RF Subcarrier Transmission Using a Dual-Function Modulator/Photodetector," IEEE Transactions on Microwave Theory and Techniques, vol. 47, Issue. 7, XP011037660, ISSN: 0018-9480, pp. 1338-1341.

Wang L.J., et al., "Experimental Multiplexing of Quantum Key Distribution With Classical Optical Communication," Applied Physics Letters, vol. 106, Feb. 25, 2015.

* cited by examiner

COMBINING QKD AND CLASSICAL COMMUNICATION

PRIORITY CLAIM

The present application is a National Phase entry of PCT Application No. PCT/EP2020/073130, filed Aug. 18, 2020, which claims priority from EP Patent Application No. 19197082.1, filed Sep. 12, 2019, each of which is hereby fully incorporated herein by reference.

BACKGROUND

DWDM (Dense Wavelength Division Multiplexing) involves multiplexing signals from multiple clients onto the same optical fiber. The multiple signals are transmitted simultaneously, each at a slightly different wavelength, within a narrow waveband. This waveband is the band of operation of erbium doped fiber amplifiers (EDFAs). The signals are de-multiplexed downstream and each are transmitted to a transponder associated with the intended recipient of the data. The transponder of the recipient client transmits a reply signal which is multiplexed onto a second optical fiber and transmitted using DWDM at the same frequency as the corresponding downstream signal. It is then received at the transponder of the intended upstream recipient client.

Quantum Key Distribution (QKD) is a method of establishing a shared quantum key between a quantum transmitter and a quantum receiver. It involves encoding and transmitting a string of optical pulses, each in a randomly-chosen basis state, to a receiver. The receiver measures the pulses in its own randomly-chosen basis state. The transmitter and the receiver then exchange the basis states they each used and use these to generate a shared secret key. This can be used to encrypt subsequent transmissions.

It may be that a network needs to transmit both DWDM signals and QKD signals. It is desirable to minimize the number of optical fibers used. In known arrangements, the QKD transmitter and receiver share an optical fiber with either the upstream or the downstream DWDM signals. This has the drawback that the DWDM signals create noise which interferes with detection of the (much lower-power) QKD pulses.

SUMMARY

The present disclosure addresses or mitigates the above-mentioned and/or other disadvantages.

According to a first aspect of the disclosure there is provided a method of communication between a client pair, the client pair comprising an upstream client and a downstream client, the upstream client being located upstream of the downstream client, the method being performed over a first optical fiber in an optical fiber pair, the method comprising: transmitting a downstream DWDM signal over the first optical fiber, wherein the downstream DWDM signal has a first frequency and contains first data originating from the upstream client, transmitting an upstream DWDM signal over the first optical fiber, wherein the upstream DWDM signal has a second frequency and contains second data originating from the downstream client, wherein the first frequency is different to the second frequency, and performing Quantum Key Distribution over a second optical fiber of the optical fiber pair.

An advantage of this method over conventional approaches is that, in the present disclosure, the upstream and downstream signals transmitted between a given client pair have different frequencies. This means that they can be carried by the same optical fiber without generating significant crosstalk. Using the first optical fiber for both upstream and downstream DWDM signals leaves the second optical fiber free to be used for QKD alone. This greatly reduces the noise suffered by the QKD pulses and so improves the efficiency of the QKD method.

According to a second aspect of the disclosure there is provided a communication system comprising: a client pair, comprising an upstream client and a downstream client, an optical fiber pair, comprising a first optical fiber and a second optical fiber, an upstream transmitter for transmitting a downstream DWDM signal over the first optical fiber, the downstream DWDM signal having a first frequency and containing first data originating from the upstream client, a downstream transmitter for transmitting an upstream DWDM signal over the first optical fiber, the upstream DWDM signal having a second frequency and containing second data originating from the downstream client, wherein the first frequency is different to the second frequency, and a quantum transmitter and a quantum receiver arranged to perform Quantum Key Distribution over the second optical fiber of the optical fiber pair.

"Downstream DWDM signal" refers to a DWDM signal that propagates from upstream to downstream. "Upstream DWDM signal" refers to a DWDM signal that propagates from downstream to upstream. Transmitting a downstream DWDM signal over the first optical fiber may be performed by the upstream transmitter. This may be preceded by transmitting first data from the upstream client to the upstream transmitter. The method may further comprise receiving the downstream signal at a downstream receiver associated with the downstream client. The method may further comprise sending first data from the received signal from the downstream receiver to the downstream client. The first frequency may be in the L-band of the DWDM frequency range and may be within the range of 1570 nm to 1610 nm inclusive. Alternatively the first frequency may be in the C-band of the DWDM frequency range and may be within the range of 1525 nm to 1565 nm inclusive.

Transmitting an upstream DWDM signal over the first optical fiber may be performed by the downstream transmitter. This may be preceded by transmitting second data from the downstream client to the downstream transmitter. The method may further comprise receiving the upstream signal at an upstream receiver associated with the upstream client. The method may further comprise sending second data from the received signal from the upstream receiver to the upstream client. The second frequency may be in the L-band of the DWDM frequency range and may be within the range of 1570 nm to 1610 nm inclusive. Alternatively the second frequency may be in the C-band of the DWDM frequency range and may be within the range of 1525 nm to 1565 nm inclusive.

The first and second fibers may be co-located for at least a portion of their length and may be located in the same fiber bundle for at least a portion of their length. The Quantum Key Distribution may be performed between a quantum transmitter and a quantum receiver. The quantum transmitter and the quantum receiver may be different to the upstream client and the downstream client. In some embodiments, the key agreement step of QKD is performed over the first fiber. In these embodiments the pulse transmission is performed over the second fiber. In alternative embodiments both the pulse transmission and the key agreement are performed over the second optical fiber.

In some embodiments there is a second client pair comprising a second upstream client and a second downstream client. In these embodiments, the method may further comprise transmitting a second downstream DWDM signal over the first optical fiber. The second downstream DWDM signal may have a third frequency, which may be different to the first and second frequencies. The second downstream DWDM signal may contain third data originating from the second upstream client. The second downstream signal may be multiplexed on to the first optical fiber with the first downstream signal. The method may further comprise transmitting a second upstream DWDM signal over the first optical fiber. The second upstream DWDM signal may have a fourth frequency, which may be different to the first, second and third frequencies. The second upstream DWDM signal may contain fourth data originating from the second downstream client. The second upstream signal may be multiplexed on to the first optical fiber with the second downstream signal. The features defined above in relation to the client pair are also applicable to the second client pair, mutatis mutandis. For example, the second upstream client has an associated second upstream transmitter and an associated second upstream receiver. Furthermore, the second downstream client has an associated second downstream transmitter and an associated second downstream receiver.

In some embodiments there may be one or more further client pairs, each comprising an upstream client and a downstream client. The method may further comprise the one or more further client pairs performing the communication method defined above in relation to the client pair over the first optical fiber.

In some embodiments, the second optical fiber is used for transmitting signals associated with QKD only. In some embodiments, the second optical fiber is used for transmitting QKD pulses only.

BRIEF DESCRIPTION OF THE DRAWINGS

A specific embodiment of the disclosure will now be described, for illustration only, with reference to the accompanying drawings, in which.

DETAILED DESCRIPTION

This disclosure relates to Quantum Key Distribution and Dense Wavelength Division Multiplexing. Each is described briefly below.

Quantum Key Distribution (QKD) involves establishing a shared quantum key between a transmitter and a receiver. It involves a first stage, known as the pulse transmission stage, in which each of a string of optical pulses are randomly encoded with a bit value of 1 or 0. Each encoded pulse is transmitted in a randomly chosen basis state, to the receiver along a quantum channel (often an optical fiber). The receiver measures each pulse in its own randomly-chosen basis state. The next stage is the key agreement stage, in which the transmitter and receiver exchange information relating to the basis states each used to transmit or measure the pulses. This is done using classical (i.e. non-quantum) optical signals over a channel which may or may not be the optical fiber used for the pulse transmission stage. The transmitter and receiver use the exchanged information to establish the shared quantum key, which they use to perform QKD-encrypted communication between each other using classical signals.

Dense Wavelength Division Multiplexing (DWDM) is a method of transmitting classical signals from a transmitter to a receiver over an optical fiber. The method involves simultaneously transmitting multiple signals, of slightly differing frequencies, along an optical fiber. The frequencies of the transmitted signals must all fall within the band of operation of erbium doped fiber amplifiers (EDFAs), i.e. they must fall between approximately 1525-1565 nm, or approximately 1570-1610 nm. This results in a wavelength spacing between the signals of approximately 4 nm. The close spacing provides data rates of up to 1 Tb/s. This is much higher than in other forms of WDM.

Figure 1:
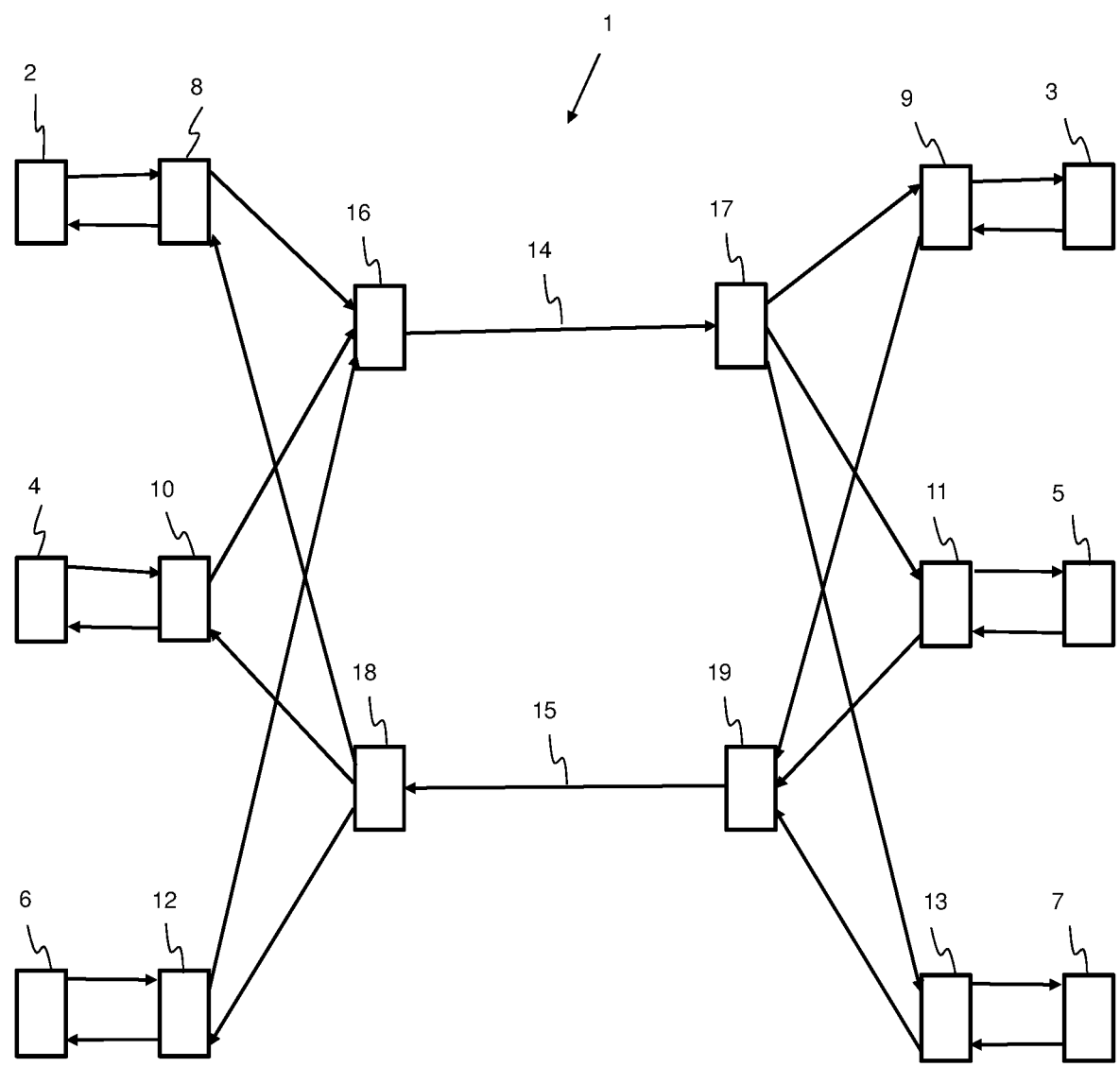
FIG. 1 is a schematic representation of a known DWDM system.

An example of a DWDM arrangement is shown at FIG. 1. The arrangement is shown generally at 1. The arrangement contains three client pairs, each pair containing an upstream client 2, 4, 6 and a downstream client 3, 5, 7. In this description, "upstream client" refers to a client located on the left-hand side of a Figure and a "downstream client" refers to a client located on the right-hand side of a Figure. An "upstream signal" is a signal sent from a downstream client to an upstream client and a "downstream signal" is a signal sent from an upstream client to an downstream client. For simplicity, only three client pairs are shown. However, in reality, many more are possible. The first upstream client 2 sends data for transmission downstream to a transponder 8. The transponder 8 transmits the data as an optical signal to a multiplexer 16, which multiplexes the signal using DWDM onto optical fiber 14 to a downstream multiplexer 17. Multiplexing means the signal is sent along with other signals, the signals each having a slightly different frequency, and which all fall within one of two frequency bands: the C band (approx. 1525-1565 nm) or the L band (approx. 1570-1610 nm). De-multiplexer 17 de-multiplexes the signal (i.e. separates it from those other signals) and sends it on to transponder 9, which in turn sends it on to client 3. Client 3 sends reply data to transponder 9. Transponder 9 transmits the reply data as an optical signal to a multiplexer 19, which multiplexes the signal using DWDM onto optical fiber 15 to an upstream de-multiplexer 18. This upstream optical signal has the same frequency as the downstream optical signal that was sent from transponder 8 to transponder 9. De-multiplexer 18 de-multiplexes the upstream signal (i.e. separates it from the other signals on fiber 15) and sends it on to transponder 8, which in turn sends the signal on to client 2.

The upstream client 4 of the second client pair communicates with the downstream client 5 of the second client pair in a similar way. In particular, the upstream client 4 sends data for transmission downstream to a transponder 10. The transponder 10 transmits the data as an optical signal to the multiplexer 16, which multiplexes the signal using DWDM onto optical fiber 14 to a downstream multiplexer 17. De-multiplexer 17 de-multiplexes the signal and sends it on to transponder 11, which in turn sends it on to client 5. If client 5 wishes to reply to the signal, it sends reply data to a transponder 8. The transponder transmits the reply data as an optical signal to a multiplexer 19, which multiplexes the signal using DWDM onto optical fiber 15 to an upstream de-multiplexer 18. De-multiplexer 18 de-multiplexes the signal and sends it on to transponder 10, which in turn sends the signal on to client 4.

The upstream client 6 of the third client pair communicates with the downstream client 7 of the third client pair in a similar way which will not be described in detail here.

Figure 2:
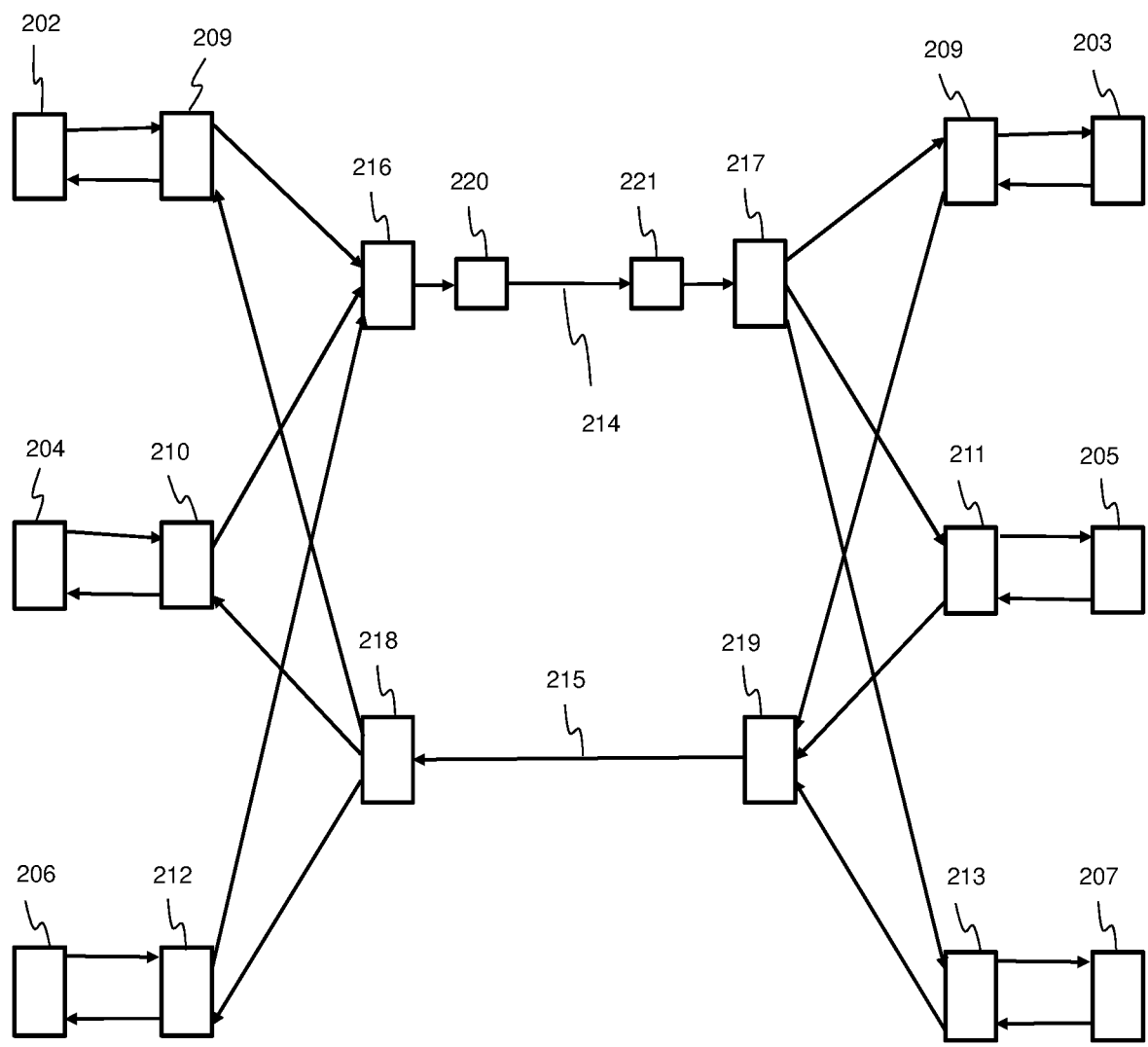
FIG. 2 is a schematic representation of a known DWDM system, incorporating a QKD transmitter and receiver pair.

As mentioned above, QKD can use optical fibers to transmit both the optical pulses of the pulse transmission stage, and the classical signals of the key agreement stage. It therefore may be useful to incorporate a quantum transmitter/receiver pair into the arrangement of FIG. 1. An example of such a modified arrangement is shown at FIG. 2. FIG. 1 and FIG. 2 are very similar, and their common features are correspondingly numbered. The only difference between FIG. 1 and FIG. 2 is the presence of a quantum transmitter 220 and a quantum receiver 221 along optical fiber 214. The quantum pair 220, 221 is suitable for performing QKD and uses optical fiber 214 for both the pulse transmission and key agreement stages. In this arrangement, the three client pairs 202, 203; 204, 205; 206, 207 communicate using DWDM as described in relation to FIG. 1. A disadvantage of such an arrangement is that interference can occur between the DWDM signals between the client pairs and the (much lower power) optical pulses sent from the quantum transmitter 220 and quantum receiver 221. This can make it difficult for quantum receiver 221 to measure the pulses accurately.

Figure 3:
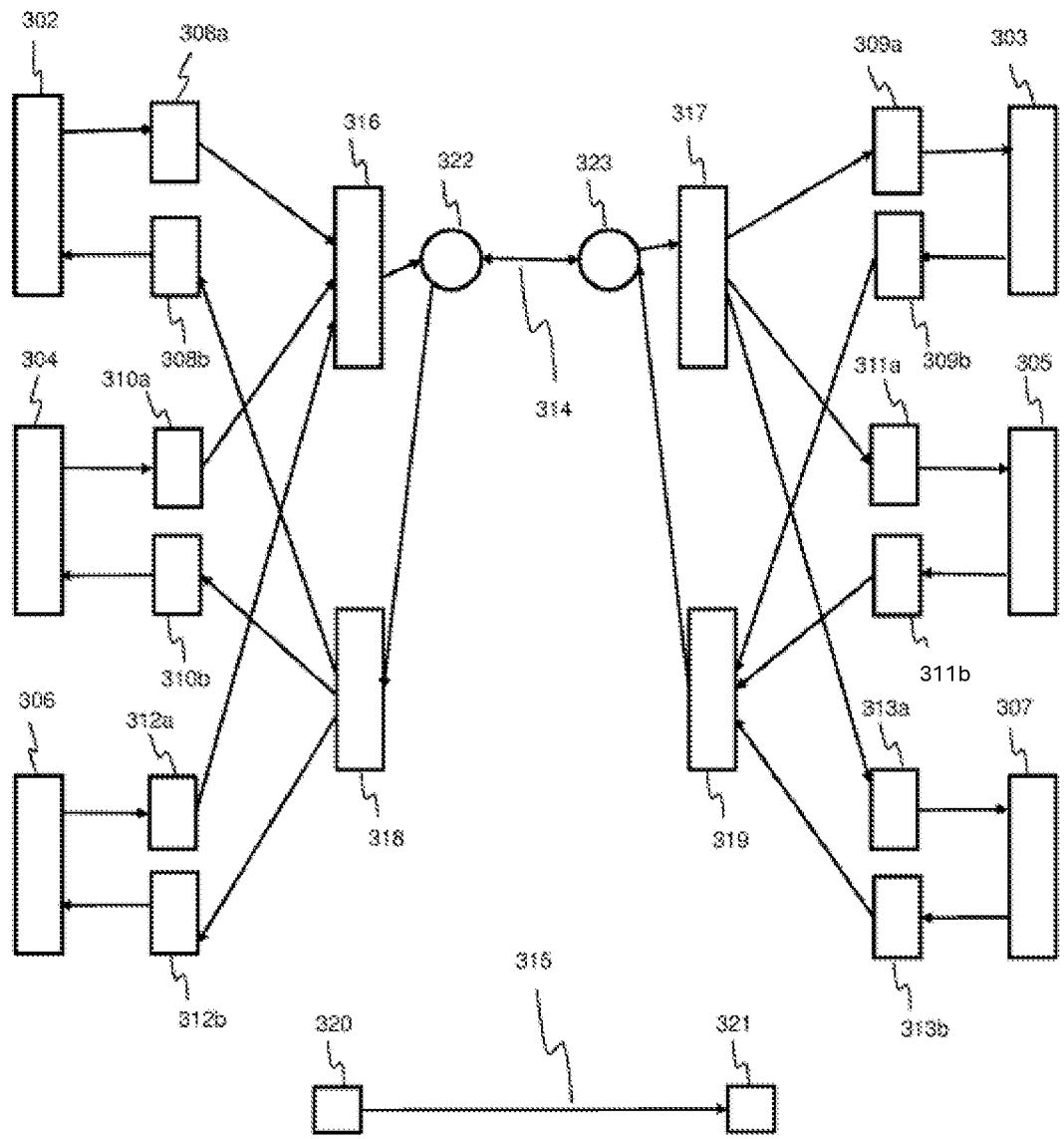
FIG. 3 is a schematic representation of a DWDM system in accordance with the disclosure.

Embodiments of the disclosure address this problem. An arrangement according to the disclosure is shown at FIG. 3. The features FIG. 3 has in common with FIG. 1 are correspondingly numbered. An important difference between FIG. 3 and FIGS. 1 and 2 is that in FIG. 3, both the upstream and the downstream DWDM signals are sent along the same fiber, in this case 314. Only QKD signals are sent along the other fiber 315. As in FIGS. 1 and 2 there are three client pairs, here numbered 302, 303; 304, 305; 306, 307. However, in FIG. 3, each client is associated with two transponders. In the prior art arrangements of FIGS. 1 and 2, each client is only associated with one transponder. The clients in FIG. 3 have two transponders because the downstream signal between each client pair has a different frequency to the upstream signal between that pair. This is different to FIGS. 1 and 2 in which the upstream and downstream signals sent between each client pair have the same frequency. A transponder contains a transmitter and a receiver which operate on the same frequency. Transmitting a signal of one frequency and receiving a signal of a different frequency therefore requires two transponders. In one of the transponders, the transmitter is used and the receiver is not used. In the other transponder, the receiver is used and the transmitter is not used.

In use, the upstream client 302 sends data for transmission downstream to a transmitter 308a. The transponder 308a transmits the data as an optical signal to the multiplexer 316, which uses DWDM to multiplex the signal onto optical fiber 314 along with downstream signals from the upstream client 304 of the second pair and the upstream client 306 of the third pair. Optical fiber 314 is provided with two optical circulators 322 and 323. The multiplexed signal from multiplexer 316 passes along an upstream portion of fiber 314, reaches circulator 322 and passes in a clockwise direction around the circulator 322. The signal continues along a central portion of fiber 314 and passes again in a clockwise direction around circulator 323, from where it is directed along a downstream portion of fiber 314 to de-multiplexer 317. De-multiplexer 317 de-multiplexes the signal and sends it on to transponder 309a, which in turn sends it on to client 303. Client 303 sends reply data to a transponder 309b. The transponder 309b transmits the reply data as an optical signal to a multiplexer 319. This signal has a different frequency to the downstream DWDM signal received at transponder 309a. Multiplexer 319 uses DWDM to multiplex the signal onto optical fiber 314 along with upstream signals from the downstream client 305 of the second pair and the downstream client 307 of the third pair. The multiplexed signal reaches circulator 323 and passes in a clockwise direction around it. The signal continues along the central portion of fiber 314 and passes again in a clockwise direction around circulator 322, from where it is directed along an upstream portion of fiber 314 to de-multiplexer 318. De-multiplexer 318 de-multiplexes the signal and sends it on to transponder 308b, which in turn sends it on to client 302. Transponder 308b is sensitive to signals of the frequency of the received signal.

A corresponding process occurs between the second client pair 304 and 305. In particular, the upstream client 304 sends data for transmission downstream to a transponder 310a. The transponder 310a transmits the data as an optical signal to the multiplexer 316, which uses DWDM to multiplex the signal onto optical fiber 314 along with upstream signals from the upstream client 302 of the first pair and the upstream client 306 of the third pair. Optical fiber 314 is provided with two optical circulators 322 and 323. The multiplexed signal from multiplexer 316 passes along an upstream portion of fiber 314, reaches circulator 322 and passes in a clockwise direction around the circulator 322. The signal continues along a central portion of fiber 314 and passes again in a clockwise direction around circulator 323, from where it is directed along a downstream portion of fiber 314 to de-multiplexer 317. De-multiplexer 317 de-multiplexes the signal and sends it on to transponder 311a, which in turn sends it on to client 305. Client 305 sends reply data to a transponder 311b. The transponder 311b transmits the reply data as an optical signal to a multiplexer 319. This signal has a different frequency to the downstream DWDM signal received at transponder 311a. Multiplexer 319 uses DWDM to multiplex the signal onto optical fiber 314 along with upstream signals from the downstream client 303 of the first pair and the downstream client 307 of the third pair. The multiplexed signal reaches circulator 323 and passes in a clockwise direction around it. The signal continues along the central portion of fiber 314 and passes again in a clockwise direction around circulator 322, from where it is directed along an upstream portion of fiber 314 to de-multiplexer 318. De-multiplexer 318 de-multiplexes the signal and sends it on to transponder 310b, which in turn sends it on to client 304. Transponder 310b is sensitive to signals of this frequency.

A corresponding process occurs between the third client pair 306 and 307. This will not be described in detail.

All of the signals sent between the upstream clients 302, 304, 306 and their corresponding downstream clients 303, 305, 307 are carried by fiber 314. None of them are carried by fiber 315, which is used exclusively for QKD between quantum transmitter 320 and quantum receiver 321. In this example, fiber 315 is used for both the pulse transmission stage and the key agreement stage of QKD.

As the QKD transmissions use a different fiber to the DWDM transmission the interference between the two is greatly reduced relative to prior art arrangements. Furthermore, the fact that the upstream and downstream DWDM signals use different frequencies greatly mitigates the cross talk that would occur if the same frequency signal were used for upstream and downstream transmissions (as is the case in conventional DWDM).

The invention claimed is:

1. A method of communication between a client pair, the client pair comprising an upstream client and a downstream client, the upstream client being located upstream of the downstream client, the method being performed over a first optical fiber in an optical fiber pair, the method comprising:
    transmitting a downstream Dense Wavelength Division Multiplexing (DWDM) signal over the first optical fiber, wherein the downstream DWDM signal has a first frequency and contains first data originating from the upstream client;
    transmitting an upstream DWDM signal over the first optical fiber, wherein the upstream DWDM signal has a second frequency and contains second data originating from the downstream client, wherein the first frequency is different from the second frequency; and
    performing Quantum Key Distribution in the absence DWDM over a second optical fiber of the optical fiber pair.

2. The method as claimed in claim 1, further comprising receiving the downstream DWDM signal at a downstream receiver associated with the downstream client.

3. The method as claimed in claim 2, further comprising sending the first data from the received downstream DWDM signal from the downstream receiver to the downstream client.

4. The method as claimed in claim 1, further comprising receiving the upstream DWDM signal at an upstream receiver associated with the upstream client.

5. The method as claimed in claim 4, further comprising sending the second data from the received upstream DWDM signal from the upstream receiver to the upstream client.

6. The method as claimed in claim 1, further comprising transmitting a second downstream DWDM signal over the first optical fiber, the second downstream DWDM signal containing third data originating from a second upstream client.

7. The method as claimed in claim 6, wherein the second downstream DWDM signal is multiplexed on to the first optical fiber with the first downstream DWDM signal.

8. The method as claimed in claim 1, further comprising transmitting a second upstream DWDM signal over the first optical fiber, the second DWDM signal containing fourth data originating from the second downstream client.

9. The method as claimed in claim 8, wherein the second upstream DWDM signal is multiplexed on to the first optical fiber with the second downstream signal.

10. A communication system comprising:
    a client pair, comprising an upstream client and a downstream client;
    an optical fiber pair comprising a first optical fiber and a second optical fiber;
    an upstream transmitter for transmitting a downstream Dense Wavelength Division Multiplexing (DWDM) signal over the first optical fiber, the downstream DWDM signal having a first frequency and containing first data originating from the upstream client;
    a downstream transmitter for transmitting an upstream DWDM signal over the first optical fiber the upstream DWDM signal having a second frequency and containing second data originating from the downstream client,
    wherein the first frequency is different from the second frequency, and a quantum transmitter and a quantum receiver are arranged to perform Quantum Key Distribution in the absence of DWDM over the second optical fiber of the optical fiber pair.

* * * * *